United States Patent [19]

Seksaria et al.

[11] Patent Number: 4,905,569
[45] Date of Patent: Mar. 6, 1990

[54] SPACER ATTACHMENT DEVICES

[75] Inventors: Dinesh C. Seksaria, Pittsburgh; James D. Klingensmith, Apollo; David N. Hansen, Murrysville, all of Pa.

[73] Assignee: Aluminum Company of America, Pittsburgh, Pa.

[21] Appl. No.: 243,508

[22] Filed: Sep. 12, 1988

[51] Int. Cl.[4] .................................. F41H 5/06
[52] U.S. Cl. ................................ 89/36.02; 52/202
[58] Field of Search ............... 89/36.02, 36.08, 36.12; 52/808, 800, 805, 202, 203, 787; 428/911; 114/11, 12, 13, 14; 249/39, 43, 217

[56] References Cited

U.S. PATENT DOCUMENTS

| 98,714 | 1/1870 | Sargent | 109/79 |
|---|---|---|---|
| 120,577 | 11/1871 | Farrel | 109/79 |
| 434,503 | 8/1890 | Corry | 109/79 |
| 1,532,362 | 4/1925 | Bailey | 428/911 |
| 1,666,486 | 4/1928 | Brainard et al. | 109/79 |
| 1,679,802 | 8/1928 | Allerheiligen et al. | 52/203 |
| 1,694,676 | 12/1928 | Will | 52/203 |
| 1,713,339 | 5/1929 | Holden | 89/36.12 |
| 2,099,260 | 11/1937 | Colt | 249/43 |
| 2,116,597 | 5/1938 | Colt | 249/217 |
| 2,380,393 | 7/1945 | Berg | 109/49.5 |
| 3,008,552 | 11/1961 | Cushman et al. | 52/787 |
| 3,625,470 | 12/1971 | Shoemaker | 249/43 |
| 3,648,961 | 3/1972 | Farrow | 249/43 |
| 4,167,889 | 9/1979 | Bohne et al. | 89/36.02 |
| 4,309,856 | 1/1982 | Varnau et al. | 52/787 |
| 4,545,286 | 10/1985 | Fedij | 89/36.02 |
| 4,716,810 | 1/1988 | DeGuvera | 89/36.02 |

FOREIGN PATENT DOCUMENTS

| 150122 | 2/1953 | Australia . | |
|---|---|---|---|
| 566754 | 12/1932 | Fed. Rep. of Germany . | |
| 631899 | 6/1936 | Fed. Rep. of Germany . | |
| 1484323 | 3/1969 | Fed. Rep. of Germany . | |
| 2222455 | 11/1973 | Fed. Rep. of Germany . | |
| 2542142 | 5/1986 | Fed. Rep. of Germany . | |
| 812540 | 4/1959 | United Kingdom | 52/787 |

Primary Examiner—Charles T. Jordan
Assistant Examiner—Stephen Johnson
Attorney, Agent, or Firm—Elroy Strickland

[57] ABSTRACT

An inexpensive light weight spacer and support for suspending items on or from a host surface. The spacer and support comprises a cone-type structure, the structure having a bushing-like end at the apex thereof for receiving and holding the supported item. An opening is provided in the bushing-like end for receiving a fastener. The base end of the cone-shaped structure is provided with a flange portion for receiving fasteners for securing the cone and item to the host surface.

1 Claim, 2 Drawing Sheets

SPACER ATTACHMENT DEVICES

BACKGROUND OF THE INVENTION

The present invention relates generally to devices for supporting and suspending items, such as applique armor panels to an armored surface, or pipe and conduit structures from a wall or ceiling structure. More particularly, the invention is directed to hollow tapered devices that are light weight and inexpensive to produce yet provide a reliable, easy to use suspension and support system for items to be attached to a host structure. A cone-shaped device is preferred as the supporting device, as a cone shape is the lightest in weight and the highest in strength of all the available shapes.

Over the years, a number of devices have been employed to hang armor on the armored surfaces of military vehicles. An early (1945) example of this is U.S. Pat. No. 2,380,393 to Berg. Berg secures spacers 5 to an armored surface 2. Each spacer includes a boss 6 that extends through an opening provided in an armor plate 3. A headed bolt 9 is threaded into the boss to secure the armor plate to the spacer and thus to the armored surface.

U.S. Pat. No. 4,167,889 to Bohne et al shows a solid rubber buffer (spacer) secured at its base to the surface of an armored vehicle by a collar 11 welded to the armored surface. A threaded bushing 7 is cast in the rubber spacer, at its outer end, for securing armor plate to the rubber buffer by a bolt 6 threaded into the bushing.

U.S. Pat. No. 4,545,296 to Fedij shows a half spherical steel spacer 26 welded or fused to the back side of an armored tile 12. The tile and spherical spacer are attached to the hull of an armored vehicle by a threaded bolt extending through the spacer and into the vehicle surface. When an incoming shell strikes the tile in an off centered manner the bolt breaks and the tile rotates about the rounded surface of the spacer.

A welded boss 56 similar to that of Berg is shown in U.S. Pat. No. 4,716,810 to DeGuvera. A nylon spacer 14 is secured to the welded boss for attaching armor plate to an armored surface.

There are, of course, many types of military vehicles on which applique armor may be mounted, as well as a multitude of other types of structures using spacer support systems. Each application has its peculiar characteristics and operating conditions, such as ballistic loading, noises and vibrations, etc. In providing applique (auxiliary) armor for each vehicle type, it is desirable that a system for attaching armor be capable of being easily adapted and adjusted to the particular armor/vehicle system and their dynamic conditions.

Another challenge in designing systems to attach applique armor to a vehicle is to reduce the weight of attaching devices. It is desirable, of course, to reduce vehicle weight, and it can be appreciated that a large number of dense, hard bosses and bushings attached to the outside surface of the vehicle can add a substantial amount of weight to the vehicle. In addition, such bosses and bushings protrude outwardly from the vehicle surface. When they are not being employed to support applique armor they are subject to being snagged and broken off. Then, when it is desired to mount applique armor on the vehicle, the bosses will not be available. These bosses also require additional space in transport and storage of such vehicles, particularly in cramped quarters of a ship's hull, as well as in maneuvering the vehicle amongst trees and other obstacles that may be in the way.

A further problem with providing applique armor for military vehicles is the difficulty often encountered in the traditional attaching/removing process. What is needed in the art is a simple system for applying applique armor to military vehicles, one that can be effected with a minimum of tools, effort and time under field conditions.

SUMMARY OF THE INVENTION

It is therefore an objective of the present invention to solve the above problems in a low-cost, weight-efficient manner, and in a manner that allows one to adapt mounting devices to the conditions of a particular armor vehicle system or other uses and their environments. Other uses would include architectural/industrial piping attachments.

Attachment is best accomplished by a system of low-cost, easy to produce, conical standoffs or spacers. As explained below, the standoffs are easily provided with the needed configuration, material and strength-to-weight ratio. In this manner, the standoffs will have the "correct" strength, stiffness and damping characteristic necessary to provide noise isolation for the armor, as well as good ballistic performance and dynamic attenuation of vibrations originating with the vehicle or other structure.

The spacers are easily attached to a host surface and structure with threaded fasteners when the structure is provided with appropriately located and sized openings, and armor can be hung on the narrow apex end of the spacers when appropriate openings are provided in the armor. The armor is secured to the apex end of the cone by another fastener threaded into an appropriate opening provided in the end of the cone.

Hence, in the present invention, armor panel can be attached to a vehicle surface without welding and be easily removed when removal is desired. (The spacers can also be removed if desired to minimize outward protrusion.) The only tool needed by personnel working in the field to accomplish attachment and removal is a simple wrench or screw driver when the heads of the screws are so configured.

The spacer devices of the invention can be made by known manufacturing processes and existing, relatively low cost tooling, using standard hardware, materials and manufacturing technology; the results are weight efficient, structurally sound, low cost devices for attaching spaced applique items to a host surface.

THE DRAWINGS

The invention, along with its objectives and advantages, will be best understood from consideration of the following detailed description and the accompanying drawings in which.

PREFERRED EMBODIMENTS

Figure 1:
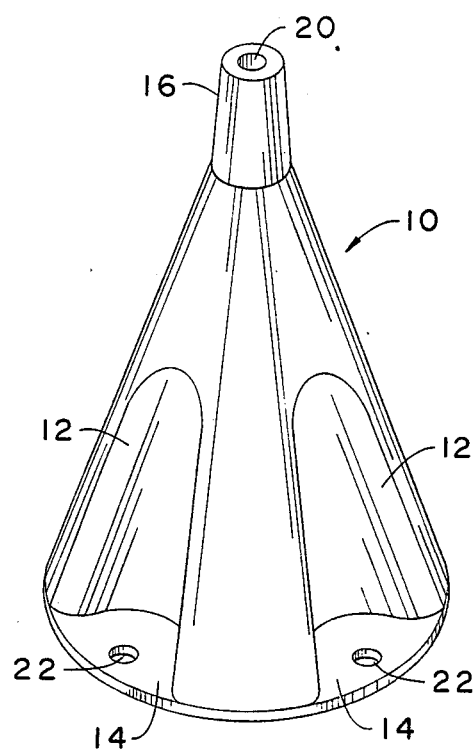
FIG. 1 is a perspective view of a convoluted spacer embodiment of the invention.

Referring now to FIG. 1 of the drawings, a hollow cone-type structure 10 is shown in perspective. The wall of the structure tapers between base and apex ends of 10 and encloses a central axis of the structure. The wall is shown with rounded convolutions 12 that provide flange areas or portions 14 at the wide base of the structure. At the other narrow or apex end of the cone is shown an integral tapered portion 16 (for receiving and holding an item 28 in FIG. 2), while fastening means, such as a fastener 18 (FIG. 2) is threaded into an opening 20 provided in the end of the tapered portion.

Figure 2:
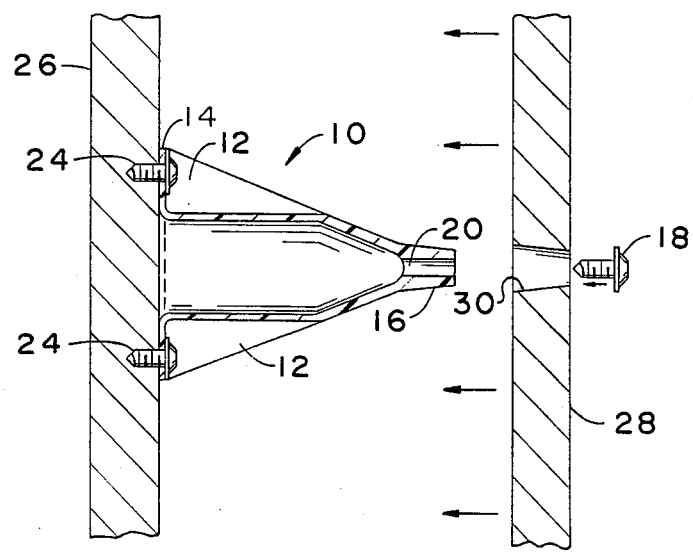
FIG. 2 is a sectional view assembly using the embodiment of FIG. 1.
Figure 3:
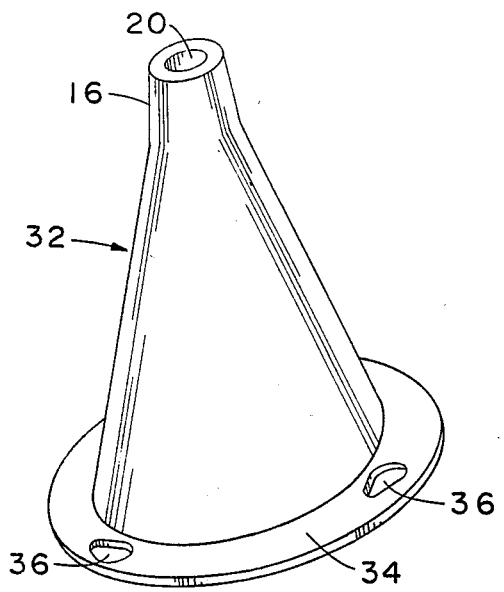
FIG. 3 is a perspective view of a second embodiment of the invention.

As shown further in FIG. 1, flange areas 14 are provided with openings 22 for the reception of fasteners 24 (FIG. 2). The openings can be circular, as shown, in FIG. 1 or bayonet type, as shown in FIG. 3. Fasteners 24 are employed to secure the cone to the surface of a host structure 26. The structure of 26 is provided with openings of appropriate diameter for receiving fasteners 24. Preferably, fasteners 24 are the same size as fastener 18 so that only one size fastener is employed in using the system of the invention. Suitable fasteners include buttonhead screws with integral washers.

In FIG. 2, host structure 26 may be the hull of a military vehicle. The openings provided in 26 are spaced apart by a distance equal to the distance between openings 22 in the base of cone 10. The task of attaching the cone is made easier if openings 22 are a bayonet type (FIG. 3) and the fasteners 24 are already located in the openings provided in host structure 26. This is important, for example, in attaching applique armor panel to the hull of a military vehicle. Military personnel working in the field and desiring to hang armor panel on a vehicle, simply back fasteners 24 part way out of the hull, align the bayonet holes in flanges 14 with the fasteners, slip the flanges past the heads of the fasteners, rotate the cone until the heads are located over the narrow portion of the bayonet opening, and then tighten fasteners 24 into the hull to secure the cone to the hull.

In the case of military vehicles, it is preferred to have fasteners 24 already located in the respective openings in hull 26. The reasons for this is to keep the openings free of mud, snow and/or ice (so that the fasteners can be quickly and easily employed for the attaching process), and to protect the threads of the openings from damage for easy threading of the fasteners. Otherwise, separate plug means would be needed to fill the openings provided in the hull.

As best seen in FIG. 2 of the drawings, the apex end 16 of cone 10 is bushing-like to receive a panel 28, and a plurality of cones 10, say four, can be used to support one such panel. A like plurality of openings 30 are provided in the panel, and suitably spaced apart and sized to fit over the bushings. Panel 28 is then secured to the apex ends of the cones by simply directing fasteners 18 into openings 20 provided in the cone bushings.

The bushings 16 and openings 30 are both preferably tapered so that each opening 30 has a wide mouth for receiving the narrow end of its respective bushing 16, thereby greatly easing the task of disposing a panel on a cone 10. As mentioned earlier, bushing 16 also retains the panel before and while fastener 18 is threaded into opening 20 of the bushing. Again, such an arrangement facilitates the task of attaching applique panels to a host surface. This can be important when the activity takes place in the field.

As shown in the sectional view of FIG. 2 of the drawings, cone 10 is a hollow structure and can be made of a polymer, metallic or composite material. A composite material is one that is manmade from two or more different materials such as glass reinforced plastic or other reinforced materials. The composition of the material, as well as its thickness, and the depth and height of convolutions 12 are all parameters that can be chosen to provide a cost effective spacer structure that is tailored to the specific needs of a particular application in terms of strength, stiffness and damping capability, and one that is optimized in regard to strength-to-weight ratio. As discussed earlier, there are many different types of vehicles used by the military that employ applique armor panels. In addition, the size and weight of the armor panels for the many types of vehicles may be different, and other uses of cone structure 10 may involve designs different than those employed for armoring vehicles. The tooling and/or molds employed to make the cone structure are easily altered to meet design specifications and changes in specifications. Similarly, the material of cone 10 is easily changed to meet design specifications. For this reason, capital investment is not large in making the cone structure of the invention, and in making multiple cone systems. The convoluted shapes of FIGS. 1 and 2 are not easily made by traditional metal forming process but are easily produced by molding processes. As discussed below, the axisymmetric shapes of FIGS. 3 and 5 are easily made by typical metal forming processes.

The base portion of cone 10 provides an additional flexibility in that its flange portions 14 will tolerate and conform to uneven surfaces, and can be formed to mate with curvilinear contours of non-planer surfaces receiving the base of the cone. It can be appreciated that the perfectly planar surface of item 26 in FIG. 2 may not always be available, particularly when working with the military vehicles in the field that may have been subject to much use and abuse.

Because the cone structure of FIGS. 1 and 2 can be structurally designed for specific applications, excess material in the cone structure is avoided, thereby avoiding waste and making efficient use of materials. Similarly, the convolutions in the side of the cone allows thinner gauge material to be used, as such convolutions add strength and stiffness to the cone. The height, strength and stiffness of cone 10 is such that ballistic loading requirements are easily met. When a projectile strikes panel 28, the cones maintain the panel the required distance from the vehicle hull such that the personnel are protected from the incoming projectile.

Dynamic damping capability is provided by cone 10 if the material of the cone is made of a polymer or other energy absorbing material, i.e., polymers have the ability to deform and thereby absorb the energy of vibration from a vehicle in the form of heat, and then release this heat (energy) to the atmosphere. The release of the heat is delayed, as a hysteresis phenomenon is involved. This is effective in keeping vibrating forces originating with the vehicle from reaching the applique armor.

Another advantage of the invention is that screws 18 and 24 are loaded primarily in tension and in shear, and do not receive bending loads, thereby permitting the use of smaller and lighter weight fasteners. Further, the use of multiple fasteners improves the reliability of the attachment process, and the use of self-tapping screws, for example, results in a better fit between mating threads, and higher resistance to vibration loosening and fatigue. The result is a high performance and reliable armor attachment for military vehicles and other uses.

Figure 4:
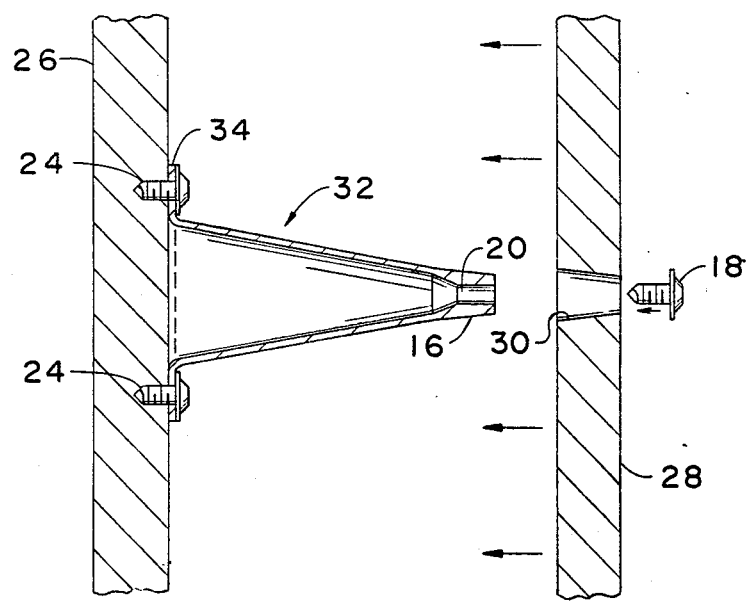
FIG. 4 is a sectional view assembly using the embodiment of FIG. 3.

FIGS. 3 and 4 of the drawings show another hollow cone-shaped embodiment of the invention for attaching items 28 to a host structure 26. The cone of FIGS. 3 and 4 is labeled 32 and is similar to that of cone 10, as the narrow apex end of the structure has a tapered portion 16 and an annular flanged base 34. The material of cone 32 is shown (cross-hatched) as metal in FIG. 4, though the cone can be made from polymer or composite material. The flange of the structure is an outwardly extending edge that encircles the base of the cone, as opposed to the flange portions 14 provided by the rounded convolutions of FIGS. 1 and 2. The base flange of cone 32 is shown provided with bayonet type openings 36 equally spaced about the flange for the reception of fasteners 24 to secure the cone to host structure and surface 26.

Cone 32 has all of the advantages of cone 10 except for the strengthening convolutions. If the material of cone 32 is metal, it will not have the greater energy dissipating capability of a polymer material. The strength and flexibility of the cone, however, can be tuned and tailored to specific applications, like that of cone 10, such that the strength/unit mass of the structure has substantial advantages over solid bushings that are welded to host surfaces.

Cone 32 has also the advantage of being manufactured by inexpensive means using near net shape spin forming technology, as the geometry of 32 is axisymmetric. The result is a weight-efficient, structurally sound, low cost attachment device.

While the invention has been described in terms of preferred embodiments, the claims appended hereto are intended to encompass all embodiments which fall within the spirit of the invention.

What is claimed is:

1. A hollow cone for supporting an applique structure on a host surface, and for spacing said applique structure from said surface, said cone being secured to and removable from the host surface by use of removable fasteners, and the applique structure being secured to and removable from the cone by a removable fastener, said cone including:
   a narrow bushing-like end portion for receiving the applique structure, and for receiving said removable fastener,
   a relatively wide base portion having flanges for attaching the cone to the host surface with said removable fasteners, and
   a circumferentially and linearly continuous wall integral with and extending between the bushing end and wide base portions of the cone, the thickness of said wall being considerably smaller than the circumferential and linear extent thereof,
   with said wall having convolutions that provide said flanges at the base portion of the cone for attachment to the host surface.

* * * * *